(12) United States Patent
Schwellenbach et al.

(10) Patent No.: US 12,203,908 B2
(45) Date of Patent: Jan. 21, 2025

(54) CHROMATOGRAPHY METHOD, METHOD OF DETERMINING THE INFLUENCE OF THE INTERDEPENDENCY OF AT LEAST TWO PARAMETERS IN A CHROMATOGRAPHY METHOD AND METHOD OF OBTAINING AT LEAST ONE CHROMATOGRAPHY METHOD PARAMETER

(71) Applicant: Sartorius Stedim Biotech GmbH, Göttingen (DE)

(72) Inventors: Jan Schwellenbach, Göttingen (DE); Volkmar Thom, Göttingen (DE); Dominik Stein, Göttingen (DE)

(73) Assignee: Sartorius Stedim Biotech GmbH (DE)

( * ) Notice: Subject to any disclaimer, the term of this patent is extended or adjusted under 35 U.S.C. 154(b) by 315 days.

(21) Appl. No.: 17/595,580

(22) PCT Filed: May 8, 2020

(86) PCT No.: PCT/EP2020/062849
§ 371 (c)(1),
(2) Date: Nov. 19, 2021

(87) PCT Pub. No.: WO2020/239392
PCT Pub. Date: Dec. 3, 2020

(65) Prior Publication Data
US 2022/0082540 A1  Mar. 17, 2022

(30) Foreign Application Priority Data
May 24, 2019 (EP) .................................. 19176446

(51) Int. Cl.
*G01N 30/86* (2006.01)
*G01N 30/02* (2006.01)

(52) U.S. Cl.
CPC ... *G01N 30/8658* (2013.01); *G01N 2030/025* (2013.01); *G01N 2030/027* (2013.01)

(58) Field of Classification Search
CPC ......... G01N 30/8658; G01N 2030/025; G01N 2030/027; G01N 2030/8831
See application file for complete search history.

(56) References Cited

U.S. PATENT DOCUMENTS

| | | | | |
|---|---|---|---|---|
| 3,728,526 A | * | 4/1973 | Youngblood | ........ G05B 13/042 |
| | | | | 700/270 |
| 4,364,263 A | * | 12/1982 | Sankoorikal | ........... G01N 30/22 |
| | | | | 73/61.56 |

(Continued)

FOREIGN PATENT DOCUMENTS

| | | |
|---|---|---|
| CN | 102271775 A | 12/2011 |
| CN | 102323360 A | 1/2012 |

(Continued)

OTHER PUBLICATIONS

Ahmad et al., "Numerical determination of the adsorption isotherms of tryptophan at different temperatures and mobile phase compositions," *Journal of Chromatography A* 1142(2): 148-163, Feb. 2007.

(Continued)

*Primary Examiner* — David J Bolduc
(74) *Attorney, Agent, or Firm* — Klarquist Sparkman, LLP (57) ABSTRACT

A chromatography method, a method of determining the concentration of at least one compound in a chromatography method and a method of obtaining at least one chromatography method parameter are provided. The methods can include selecting at least one compound, at least one stationary phase, at least one mobile phase, and at least one (Continued)

chromatography device having a chromatography bed comprising the at least one stationary phase and the at least one mobile phase.

9 Claims, 4 Drawing Sheets

(56) References Cited

U.S. PATENT DOCUMENTS

| | | | | |
|---|---|---|---|---|
| 4,579,663 | A * | 4/1986 | Poile | G01N 30/34 |
| | | | | 210/101 |
| 4,592,842 | A * | 6/1986 | Tomlinson | G01N 30/8624 |
| | | | | 210/659 |
| 4,631,687 | A * | 12/1986 | Kowalski | G01N 21/31 |
| | | | | 73/23.36 |
| 4,762,617 | A * | 8/1988 | Stevens | G01N 30/38 |
| | | | | 210/198.2 |
| 4,772,388 | A * | 9/1988 | Allington | G01N 30/32 |
| | | | | 210/103 |
| 4,865,746 | A | 9/1989 | Overfield | |
| 4,869,093 | A | 9/1989 | Gilbert | |
| 4,941,101 | A * | 7/1990 | Crilly | G01N 30/8624 |
| | | | | 73/23.23 |
| 5,039,409 | A * | 8/1991 | Blaffert | G01N 30/88 |
| | | | | 210/198.2 |
| 5,135,549 | A * | 8/1992 | Phillips | G01N 30/30 |
| | | | | 95/8 |
| 5,135,657 | A | 8/1992 | Zavitsanos | |
| 5,240,603 | A | 8/1993 | Frank et al. | |
| 5,265,031 | A * | 11/1993 | Malczewski | G01N 33/0022 |
| | | | | 702/24 |
| 5,322,626 | A | 6/1994 | Frank et al. | |
| 5,384,042 | A | 1/1995 | Afeyan et al. | |
| 5,437,179 | A * | 8/1995 | Wiegand | G01N 30/68 |
| | | | | 73/23.35 |
| 5,543,315 | A * | 8/1996 | Sugiyama | G01N 30/28 |
| | | | | 73/61.52 |
| 5,549,819 | A | 8/1996 | Nickerson | |
| 5,567,227 | A * | 10/1996 | Henderson | G01N 30/32 |
| | | | | 95/82 |
| 5,582,736 | A | 12/1996 | Hotier et al. | |
| 5,589,630 | A * | 12/1996 | Wiegand | G01N 30/30 |
| | | | | 73/23.35 |
| 5,804,142 | A * | 9/1998 | Ito | G01N 30/88 |
| | | | | 700/273 |
| 5,938,931 | A * | 8/1999 | Ono | G01N 30/8651 |
| | | | | 73/61.52 |
| 6,019,896 | A * | 2/2000 | Mansfield | G01N 27/44717 |
| | | | | 210/198.2 |
| 6,036,856 | A * | 3/2000 | Ono | G01N 30/8651 |
| | | | | 210/656 |
| 6,175,409 | B1 | 1/2001 | Nielsen et al. | |
| 6,260,407 | B1 | 7/2001 | Petro et al. | |
| 6,265,226 | B1 | 7/2001 | Petro et al. | |
| 6,294,388 | B1 | 9/2001 | Petro | |
| 6,360,588 | B1 * | 3/2002 | Ross | G01N 13/04 |
| | | | | 73/38 |
| 6,551,512 | B1 | 4/2003 | Britsch et al. | |
| 6,613,224 | B1 * | 9/2003 | Strand | G01N 30/6091 |
| | | | | 210/656 |
| 6,737,376 | B1 | 5/2004 | Heckmann et al. | |
| 7,018,540 | B2 * | 3/2006 | Brann | G01N 30/88 |
| | | | | 210/659 |
| 9,766,217 | B2 | 9/2017 | Kidal et al. | |
| 2001/0027949 | A1 | 10/2001 | Safir et al. | |
| 2002/0010566 | A1 | 1/2002 | Chester et al. | |
| 2002/0115566 | A1 | 8/2002 | Sessler et al. | |
| 2003/0116195 | A1 * | 6/2003 | Weissgerber | G05D 7/0676 |
| | | | | 137/487.5 |
| 2003/0159993 | A1 | 8/2003 | Yin et al. | |
| 2003/0203502 | A1 | 10/2003 | Zenhausern et al. | |
| 2004/0101990 | A1 | 5/2004 | Dunn et al. | |
| 2005/0009175 | A1 | 1/2005 | Bergh et al. | |
| 2005/0230616 | A1 | 10/2005 | Cameron et al. | |
| 2006/0120683 | A1 | 6/2006 | Kamp et al. | |
| 2007/0215534 | A1 | 9/2007 | Thommes et al. | |
| 2008/0092639 | A1 | 4/2008 | Lee | |
| 2008/0223794 | A1 | 9/2008 | Yamamichi et al. | |
| 2010/0004907 | A1 | 1/2010 | Kidal et al. | |
| 2010/0055664 | A1 | 3/2010 | Zheng et al. | |
| 2010/0252502 | A1 * | 10/2010 | Witt | F04B 11/0075 |
| | | | | 210/656 |
| 2012/0118144 | A1 | 5/2012 | Cates | |
| 2012/0283959 | A1 * | 11/2012 | Ruzic | G16C 20/70 |
| | | | | 702/23 |
| 2013/0173014 | A1 | 7/2013 | Mikos et al. | |
| 2013/0319086 | A1 | 12/2013 | Wyndham et al. | |
| 2015/0129474 | A1 | 5/2015 | Bouvier et al. | |
| 2015/0298025 | A1 | 10/2015 | Schultz | |
| 2015/0321191 | A1 | 11/2015 | Kendall et al. | |
| 2015/0343372 | A1 | 12/2015 | Marei et al. | |
| 2017/0322190 | A1 * | 11/2017 | Nyholm | G01N 30/50 |
| 2018/0128096 | A1 | 5/2018 | Cox | |
| 2018/0180580 | A1 | 6/2018 | Tadigadapa et al. | |
| 2018/0284085 | A1 | 10/2018 | Arigo et al. | |
| 2019/0083951 | A1 | 3/2019 | Buchner et al. | |
| 2019/0170705 | A1 | 6/2019 | Wyndham et al. | |
| 2019/0250076 | A1 | 8/2019 | Tsai | |
| 2020/0300820 | A1 | 9/2020 | Tarafder et al. | |
| 2020/0348274 | A1 * | 11/2020 | Wang | C22B 3/22 |
| 2020/0378985 | A1 | 12/2020 | Ray et al. | |
| 2021/0187476 | A1 * | 6/2021 | Öhman | C08B 37/0039 |
| 2021/0239662 | A1 * | 8/2021 | Widehammar | G01N 30/8658 |
| 2022/0026405 | A1 | 1/2022 | Kartanas et al. | |

FOREIGN PATENT DOCUMENTS

| | | |
|---|---|---|
| CN | 103182198 A | 7/2013 |
| CN | 105518454 A | 4/2016 |
| CN | 106596761 A | 4/2017 |
| CN | 106596815 A | 4/2017 |
| CN | 107110835 A | 8/2017 |
| CN | 109092276 A | 12/2018 |
| EP | 0 359 320 A2 | 3/1990 |
| WO | WO9832790 A1 | 7/1998 |
| WO | WO2005121776 A1 | 12/2005 |
| WO | WO 2008/028974 A1 | 3/2008 |
| WO | WO2014030537 A1 | 2/2014 |

OTHER PUBLICATIONS

Berridge, "Chemometrics and method development in high-performance liquid chromatography part 1: Introduction," *Chemometrics and Intelligent Laboratory Systems* 3(3): 175-188, Mar. 1988.

Field et al., "High-throughput investigation of single and binary protein adsorption isotherms in anion exchange chromatography employing multivariate analysis," *Journal of Chromatography A* 1510: 13-24, Jun. 2017.

Gritti et al., "Effect of the mobile phase composition on the isotherm parameters and the high concentration band profiles in reversed-phase liquid chromatography," *Journal of Chromatography A* 995(1-2): 37-54, May 2003.

Grom et al., "Protein A affinity chromatography of Chinese hamster ovary (CHO) cell culture broths containing biopharmaceutical monoclonal antibody (mAb): Experiments and mechanistic transport, binding and equilibrium modeling," *Journal of Chromatography B* 1083: 44-56, Mar. 2018.

Hupe et al., "Selection of optimal conditions in preparative liquid chromatography: I. Theory," *Journal of Chromatography A* 203: 41-52, Jan. 1981.

International Search Report and Written Opinion, mailed Aug. 7, 2020, issued for International Patent Application No. PCT/EP2020/062849, 18 pages.

Mao et al., "Optimization of affinity and ion-exchange chromatographic processes for the purification of proteins," *Biotechnology and Bioengineering* 52(2): 204-222, Jun. 2014.

Piatkowski et al., "Adsorbed solution model for prediction of normal-phase chromatography process with varying composition of the mobile phase," *Journal of Chromatography A* 1092(1): 65-75, Oct. 2005.

(56) References Cited

OTHER PUBLICATIONS

Schwellenbach et al., "Purification of monoclonal antibodies using a fiber based cation-exchange stationary phase: parameter determination and modeling." *Bioengineering* 3(4): 24, Dec. 2016.
Vizhemehr et al., "Modeling of gas-phase filter model for high-and low-challenge gas concentrations," *Building and Environment* 80: 192-203, Jun. 2014.
Gritti et al, "Application of the General Height Equivalent to a Theoretical Plate Equation to Size Exclusion Chromatography," Study of the Mass Transfer of High-Molecular-Mass Compounds in Liquid Chromatography, Fabrice Anal. Chem. 2007, 79, 3188-3198.

\* cited by examiner

Figure 1

P1: Reciprocating pump
MA1: Membran adsorber
B1: Feed tank
B2: Fraction collector

CHROMATOGRAPHY METHOD, METHOD OF DETERMINING THE INFLUENCE OF THE INTERDEPENDENCY OF AT LEAST TWO PARAMETERS IN A CHROMATOGRAPHY METHOD AND METHOD OF OBTAINING AT LEAST ONE CHROMATOGRAPHY METHOD PARAMETER

CROSS REFERENCE TO RELATED APPLICATIONS

This is the U.S. National Stage of International Application No. PCT/EP2020/062849, filed May 8, 2020, which was published in English under PCT Article 21 (2), which in turn claims the benefit of European Patent Application No. 19 176 446.3, filed May 24, 2019. The prior applications are incorporated herein by reference in their entirety.

The present invention relates to a chromatography method, a method of determining the influence of the interdependency of at least two parameters in a chromatography method and a method of obtaining at least one chromatography method parameter. The chromatography is carried out based on the results obtained from either the method of determining the influence of the interdependency of at least two parameters or the method of obtaining at least one chromatography method parameter.

Process development (PD) in the biopharmaceutical industry faces cost, quantity, time and transferability limitations. High throughput screening is well known to overcome the experimental limitations by parallel processing, reducing feed quantities and optimized methodology. Transferability is usually limited by not comparable operation approach or deviations in fluid dynamics.

As demonstrated in numerous studies, the analysis and modeling of mass-transfer mechanisms, fluid-dynamic behavior and kinetic phenomena involved during chromatographic operations is an important tool regarding scale-up purposes, quality-by-design approaches as well as process integration and optimization. Numerous mathematical models have been proposed to describe the profiles obtained during chromatographic operations, characterized by different complexity levels in the description of the relevant mass-transport phenomena. The general rate model (GRM) can be seen as the most universal model describing chromatography utilizing spherical porous particles. In this model convection, axial dispersion and all other relevant mass-transport resistances are taken into account. This includes the external mass transfer of solute molecules from the mobile phase to the external surface of the adsorbent particle, the diffusion within the particle and the adsorption-desorption process at the ligand sites, commonly described by various sorption isotherms like steric-mass-action (SMA). Langmuir or Freundlich.

The general rate model is often rearranged in simplified forms in which different mass transfer processes are expressed as a single term.

The model parameter determination, however, is lengthy and labor intensive. The determination of the necessary parameters is limited by experimental set up, interdependency effects, time and deviations. Estimation of the parameters is usually done by performing a fitting procedure of a simulated signal to the experimental results. This can be achieved by a mathematically solver like ASA, CMinPack, Ceres, GaLib, IPOPT, MKL or OpenBeagle targeting error minimization between experimental and simulation results.

Model identification through traditional design of experiments involves fitting a model that is linear in parameters. An example response surface model (RSM) is shown in equation (1). With this type of model, which is linear in parameters, a design is executed, where factors (x) are adjusted such that there is orthogonal information describing each of the model parameters/coefficients ($\theta$), which means that there is unique information in the design to uniquely calculate each $\theta$.

$$y = \sum_{i=1}^{K} \theta_i x_i + \sum_{i=1}^{K} \sum_{j=i+1}^{K} \theta_{i,j} x_i x_j + \sum_{i=1}^{K} \theta_{i,i} x_i^2 \qquad (1)$$

For non-linear models, where parameters/coefficients are highly correlated, estimation of each coefficient can be challenging. Coefficients are typically found by minimizing the error between measured and simulated data, as shown in equation (2).

$$\min_{\theta} J = \sum_{i=1}^{N} (\hat{y}_i - y_i)^2 \qquad (2)$$

min = minimized   $y_i$ = measured response for the ith observation
J = error function   $\hat{y}_i$ = predicted response for the ith observation
x = model factor   $\theta$ = model coefficients
K, N = total number of observations Finding the global minima of this error function in (2) for the models described e.g. in equation (8) below is a challenge, resulting in many local minima. Global optimization algorithms are available and do a good job in minimizing the prediction error, however, this solution often results in coefficients that are not physically meaningful, respectively out of the physically correct boundary conditions. In the case where there is a high correlation between coefficients, the set $\theta$ that minimizes the prediction error is not actually physically realizable. The model calibration procedure must be modified to result in coefficients that represent the actual physical system, rather than to minimize the prediction error.

Model calibration can be modified by either constraining the coefficient space (putting limits on the value of each coefficient) or by decoupling the coefficients. Constraining the coefficient space requires detail knowledge of the system that may not be known. In this invention a model calibration procedure to decouple identification of the parameters is proposed.

The target aim of a model is the mathematical and physical correct abstraction/description of a real system. Model building is usually divided into system analyzation, problem analyzation and model selection.

In the system analyzation the structural connections are identified, relevant elements and parameters evaluated and the properties combined.

The problem analyzation deals with the description of physical principles and side effects by mathematical equations.

For the model selection, the preferred equations have to display all necessary effects.

The model complexity should be high enough to describe all relevant effects and enable an extrapolation, by means of a description over the experimental space by physical correct description, while the complexity is low enough to determine the model error and prevent unnecessary experimental effort.

After the model building is finalized, the used equation parameters need to be acquired. This can either be done by prior knowledge, as manufactory information, empirical equations or measurements.

In view of the above, the technical problem underlying the present invention is to provide a physically and mathematically correct evaluation and abstraction of a chromatography method that should yield accurate results; to provide a method for obtaining chromatography method parameters using the afore-mentioned evaluated and abstracted chromatography method; and a chromatography method employing the evaluated and abstracted chromatography method or the method for obtaining chromatography method parameters.

The solution to the above technical problem is achieved by providing the subject matter characterized in the claims.

In a first aspect, the present invention relates to a method of determining the influence of the interdependency of at least two parameters in a chromatography method comprising the steps of (ia) selecting at least one compound; (ib) selecting at least one stationary phase; (ic) selecting at least one mobile phase; (id) selecting at least one chromatography device having a chromatography bed comprising the at least one stationary phase and the at least one mobile phase; (iia) determining the physical principles of the chromatography method; (iib) determining the relevant parameters from the physical principles; (iiia) selecting the at least two parameters from the relevant parameters; (iiib) determining the interdependency of the at least two parameters using the at least one chromatography device and the at least one compound; (iv) evaluating the relevant parameters using the determined interdependency of the at least two parameters; and (v) evaluating the validity of the physical principles of the chromatography method.

By (iiib) determining the interdependency of the at least two parameters using the at least one chromatography device and the at least one compound, this invention covers the use of a novel physically linked simulation parameter estimation approach, which reduces the parameter estimator error and covers physically based parameter estimation.

According to the present invention, this approach leads to global minimum parameter estimation with physically based parameter sets and reliable simulation results. The estimation of accurate and physically correct simulation parameters is essential for a correct simulative prediction of the investigated system.

Chromatography is a physical method of separation in which the components to be separated are distributed between two phases, one of which is stationary (stationary phase) while the other one (the mobile phase) moves in a predetermined direction.

The method of the present invention is not limited to a specific type of chromatography. For instance, the inventive method can be used for adsorption chromatography, affinity chromatography, column chromatography, displacement chromatography, elution chromatography, exclusion chromatography, size-exclusion chromatography, gel-permeation chromatography, frontal chromatography, gas chromatography, ion-exchange chromatography, hydrophobic interaction chromatography, mixed-mode chromatography, isothermal chromatography, liquid chromatography, normal-phase chromatography, partition chromatography, planar chromatography, programmed-flow chromatography, programmed-pressure chromatography, programmed-temperature chromatography, pyrolysis-gas chromatography, reaction chromatography, reversed-phase chromatography, supercritical fluid chromatography, two-dimensional chromatography and the like. The method according to the present invention is particularly suited for ion-exchange chromatography, hydrophobic interaction chromatography, affinity chromatography and mixed-mode chromatography.

The at least one compound selected in step (ia) is not particularly limited. For instance, it can be selected among small molecules (Mn≤8000 g/mol, determined by GPC based on polystyrene standards), drugs, proteins, nucleotides, nucleosides, biological cells, viruses, virus-like particles, antibody-drug conjugates, charge variance antibodies, antibody fragments, polyaminoacids and polypeptides. Preferably, the at least one compound comprises or is a protein and/or a drug.

According to the present invention, step (ib) is not particularly limited. In principle, any stationary phase that is suitable for chromatography can be used. Suitable stationary phases are, for instance, porous and non-porous spherical particles, porous and non-porous non-spherical particles, for example silica particles, chromatography resins, chromatography membranes, chromatography monoliths, membrane adsorbers, wovens, non-wovens and mixed matrices. According to the present invention, a chromatography membrane (for example an ion-exchange chromatography membrane), a membrane adsorber, a monolith, non-porous spherical particles or non-spherical particles is/are preferably selected as the stationary phase in step (ib).

Speaking in terms of the stationary phase being constituted by a porous particulate material, the total porosity $\varepsilon_T$ of the chromatography bed can be divided into two terms:

Internal porosity/voidage $\varepsilon_p$: This term describes the internal voidage of the porous particles with respect to the total volume of the chromatography bed.

Bulk porosity/voidage $\varepsilon_b$: This term describes the voidage between the particles in the chromatography bed (flow channels) with respect to the total volume of the chromatography bed.

Both porosity values $\varepsilon_p$ and $\varepsilon_b$ can be added to yield the total porosity $\varepsilon_T$ of the chromatographic bed:

$$\varepsilon_T = \varepsilon_p + \varepsilon_b$$

The chromatography bed can be further characterized by the

Stationary phase porosity $\varepsilon_{sp}$: This term describes the internal voidage of a porous particle with respect to the total volume of the stationary phase.

$$\varepsilon_{sp} = \frac{\varepsilon_T - \varepsilon_1}{1 - \varepsilon_b} = \frac{\varepsilon_p}{1 - \varepsilon_b}$$

Not only stationary phases constituted by particulate materials can be described by the above parameters $\varepsilon_T$, $\varepsilon_p$, $\varepsilon_b$ and $\varepsilon_{sp}$ but also stationary phases in general, such as membranes, monoliths, non-wovens, wovens and other non-particular media. Depending on the structure of the stationary phase (matrix), the internal porosity EP can equal zero, which leads to possible simplifications of the mass transport phenomena due to the absence of intra-matrix structure diffusion.

The values of the internal porosity EP, the stationary phase porosity $\varepsilon_{sp}$, the bulk porosity $\varepsilon_b$, and the total porosity $\varepsilon_T$ can be determined as explained in the following.

Inverse size exclusion chromatography (iSEC) is a widely used method to determine the voidage and porosity of chromatographic media in respect of the molecule size. A reference molecule (tracer molecule) for the inverse size exclusion chromatography has to be chosen. The size of the reference molecule should match the size of the at least one compound (e.g. a target molecule). It is preferred that the reference molecule does not interact with the stationary phase. Preferred molecule classes for the reference molecule, having a narrow and defined size distribution, are in particular but not limited to polysaccharides, polyacrylates, polystyrenes, polymethacrylates, polyacrylamides, latex beads. (Inverse size exclusion chromatography can additionally be used to calculate the pore size distribution using various models.)

A major analytical approach is represented by the conventional method of statistical moments. Applied to the chromatographic peaks resulting from a narrow rectangular pulse injection of the tracer into the system, this method is an effective approach to calculate the actual volume, voidage (porosity) and dispersion coefficient $D_{ax}$ of the chromatography bed.

Following the moment analysis technique, a voidage value, depending on buffer conditions and molecule size, can be calculated using the following approach:

$$\varepsilon = \frac{V}{\dot{V}/\mu_p} \quad (3)$$

where $\varepsilon$ represents the volume fraction accessible for the tracer molecule (reference molecule), $\dot{V}$ the chromatography bed volume, Y the volumetric flow rate and $\mu_p$ the first moment of a tracer peak.

For all signals, the first ($\mu_p$) and second ($\sigma_p^2$) moments can be measured and calculated as proposed by H. W. Haynes (A Model for the Application of Gas Chromatography to measurements of Diffusion in Bidisperse Structured Catalysts, AIChE J. 19 (1973) 1043-1046. doi:10.102/aic.690190526) and corrected, if necessary, by subtracting the moments attributed to the extra-column volume of the chromatography device (such as a HPLC system).

This correction procedure can be performed by determining the first ($\mu_{HPLC}$) and second ($\sigma_{HPLC}^2$) moment of a tracer signal measured in the absence of the chromatographic medium. The respective value is then subtracted from the first ($\mu_{p,obs}$) and second ($\sigma_{p,obs}^2$) moment determined in the presence of the chromatographic medium to eliminate the influence of the chromatographic system (see the below formulae (6) and (7)).

$$\mu_{p,obs} = \frac{\int_0^\infty C_{d,i}(t) \cdot t \cdot dt}{\int_0^\infty C_{d,i}(t) \cdot dt} \quad (4)$$

$$\sigma_{p,obs}^2 = \frac{\int_0^\infty C_{d,i}(t) \cdot (t - \mu_{p,obs})^2 \cdot dt}{\int_0^\infty C_{d,i}(t) \cdot dt} \quad (5)$$

$$\mu_p = \mu_{p,obs} - \mu_{HPLC} \quad (6)$$

$$\sigma_p^2 = \sigma_{p,obs}^2 - \sigma_{HPLC}^2 \quad (7)$$

where $\mu_p$ and $\sigma_p^2$ are the first and second moment of the tracer peak. $\mu_{p,obs}$ and $\sigma_{p,obs}^2$ are attributed to the whole system, whereas $\mu_{HPLC}$ and $\sigma_{HPLC}^2$ correspond only to the extra column volume. $C_{d,i}(t)$ represents the concentration of the tracer i at a detector at time t. That is, the concentration $C_{d,i}(t)$ is detected by the detector.

If the chromatography bed has no internal porosity, the bulk porosity $\varepsilon_b$ can be directly obtained with respect to the used molecule size by applying formulae (3), (4) and (6). In this case, $\varepsilon_b = \varepsilon = \varepsilon_T$, $\varepsilon_p = 0$ and $\varepsilon_{sp} = 0$.

If the chromatography bed has an internal porosity e, and a stationary phase porosity $\varepsilon_{sp}$, the values of $\varepsilon_p$ and $\varepsilon_{sp}$ can be determined using the following approach:

Small tracer molecules can completely access the internal voidage $\varepsilon_p$, reflecting the stagnant phase, as well as the volume $\varepsilon_b$ in the larger transport channels, occupied by the mobile phase. The obtained boundary value for the accessible volume fraction reflects therefore the total voidage $\varepsilon_T$ of the chromatography bed. That is, in case a small molecule such as acetone is used as a tracer i, $\varepsilon = \varepsilon_T$ in formula (3).

Large tracer molecules i are completely excluded from the internal voidage $\varepsilon_p$. The obtained boundary values for the accessible volume fraction reflects the external voidage (bulk porosity) $\varepsilon_b$, which is occupied by the mobile phase. That is, in case a large molecule such as dextran having a weight-average molecular weight Mw determined by size exclusion chromatography of 2 000 000 g/mol is used as a tracer i, $\varepsilon = \varepsilon_b$ in formula (3). Both boundary values are necessary to describe the stationary phase porosity of the chromatography bed $\varepsilon_{sp}$:

$$\varepsilon_{sp} = \frac{\varepsilon_T - \varepsilon_b}{1 - \varepsilon_b}$$

The same approach can be used for the internal porosity ep. Both values for the external and the total porosity are necessary for its calculation ($\varepsilon_p = \varepsilon_T - \varepsilon_b$).

The determination of $\varepsilon_p$ and $\varepsilon_{sp}$ needs therefore one tracer molecule with no accessibility to the internal porosity (such as dextran) and another tracer molecule with complete accessibility to the internal porosity (such as acetone). A combination of formulae (3), (4) and (6) makes it possible to calculate the value of $\varepsilon_p$ or $\varepsilon_{sp}$ as described in detail in J. Schwellenbach, S. Zobel, F. Taft, L. Villain, J. Strube, Purification of monoclonal antibodies using a fiber based cation-exchange stationary phase: parameter determination and modeling, Bioengineering 3 (2016) 24/1-24/20. doi: 10.3390/bioengineering3040024.

In case it is unknown whether the internal porosity $\varepsilon_p$ of the chromatography bed is zero or not, the stationary phase is dealt with in accordance with the above method for determining the internal porosity $\varepsilon_p$. If $\varepsilon_p$ is zero, the experiments with the small and large tracer molecules will yield the same result for E in formula (3), i.e. $\varepsilon_b = \varepsilon_T$, and the resulting value for $\varepsilon_p$ according to the formula "$\varepsilon_p = \varepsilon_T - \varepsilon_b$" will be 0.

In case the stationary phase is constituted by a particulate material such as silica particles, the internal porosity $\varepsilon_p$ of the chromatography bed reflects the porosity within the particles. Contrary thereto, the bulk porosity $\varepsilon_b$ is constituted the space between the particles without taking the internal porosity $\varepsilon_p$ into account. The total volume accessible by the mobile phase (total porosity $\varepsilon_T$) is the sum of the bulk and internal porosities ($\varepsilon_T = \varepsilon_p + \varepsilon_b$).

According to a preferred embodiment of the present invention, the stationary phase is a chromatography membrane (e.g. an ion-exchange chromatography membrane), a chromatography resin or a monolith, preferably a chromatography membrane or a monolith.

According to another preferred embodiment of the present invention, the stationary phase is reversibly swellable. A stationary phase is considered as "swellable" if a change of the composition of a mobile phase in contact with the stationary phase results in a change of the volume of the stationary phase. When the volume of the stationary phase changes, the porosity changes as well. Thus, according to the present invention, a stationary phase is considered as "swellable" if a change of the composition of a mobile phase in contact with the stationary phase results in a change of the internal porosity $\varepsilon_p$, the stationary phase porosity $\varepsilon_{sp}$ or the bulk porosity $\varepsilon_b$.

For instance, the change of the internal porosity $\varepsilon_p$, the stationary phase porosity $\varepsilon_{sp}$ or the bulk porosity $\varepsilon_b$ can be at least 5%, preferably at least 10%, particularly preferably at least 15%. The change of the respective porosity is calculated based on the ratio of the larger porosity to the smaller porosity. A stationary phase is considered as "reversibly swellable" if the change of the porosity is reversible, i.e. if the original porosity before the change of the composition of the mobile phase in contact with the stationary phase can be restored by restoring the original composition of the mobile phase.

According to a preferred embodiment of the present invention, a gel, preferably a hydrogel, is formed on at least a part of the surface of the stationary phase when the mobile phase is contacted with the stationary phase. Here, a "gel" is considered as a non-fluid network that is expanded throughout its whole volume by the mobile phase. Preferably, the gel is formed on the entire surface of the stationary phase. A "hydrogel" is a gel expanded by a mobile phase that is an aqueous medium.

According to a preferred embodiment of the present invention, at least a part of the surface of the stationary phase is constituted by a polymer that is bound to the surface of a stationary phase support structure. The stationary phase support structure is not particularly limited and may have the form of a particle, bead or a porous membrane. Preferably, the entirety of the surface of the stationary phase is constituted by the polymer. According to a particularly preferred embodiment of the present invention, a gel is formed from the polymer when it comes into contact with the mobile phase, as described above. It is even more preferred that this gel is a hydrogel.

According to the present invention, any mobile phase that can be used in a chromatography method can be selected in step (ic). The mobile phase is preferably liquid. Moreover, the mobile phase can include or be an organic solvent or a mixture of organic solvents. In addition to one or more organic solvents, the mobile phase can include water. Preferably, the mobile phase is an aqueous medium. The composition of the mobile phase can vary during the chromatography method (gradient chromatography). For instance, when the mobile phase includes one or more organic solvents, the concentration of the one or mare organic solvents may be changed during the chromatography. Moreover, when the mobile phase is an aqueous medium, the pH and/or the salt concentration of the mobile phase can vary during the chromatography method. For such cases (e.g. in case the pH and/or the salt concentration vary), the adsorption isotherm has to be obtained for various compositions of the mobile phase (i.e. varying pH and/or varying salt concentration).

According to the present invention, the pH of the mobile phase can in principle take any value. Preferably, the pH has a value of from 0 to 14, more preferably 2 to 12, particularly preferably 3 to 11, even more preferably 4 to 10, and most preferably 5 to 9. Of course, the pH may also be kept constant during the chromatography method.

According to the present invention, the salt concentration of the mobile phase can in principle take any value, as long as the solubility of the salt(s) in the mobile phase is not exceeded. Preferably, the salt concentration has a value ranging from 0 to 10 mol/L, more preferably 0 to 5 mol/L, particularly preferably between 0 to 3 mol/L, most preferably 0 to 1 mol/L. Of course, the salt concentration may also be kept constant during the chromatography method.

According to the present invention, one or more salts may be dissolved in the mobile phase, as mentioned above. The one or more salts are not particularly limited. Preferably, the one or more salts are selected from the group consisting of sodium chloride, potassium chloride, sodium sulfate, sodium carbonate, potassium sulfate, potassium dihydrogenphosphate, dipotassium hydrogenphosphate, ammonium sulfate, urea hydrochloride, guanidine hydrochloride, disodium hydrogenphosphate, sodium dihydrogenphosphate, tris(hydroxymethyl)aminomethane hydrochloride, glycine, trisodium citrate and combinations thereof. The mobile phase may alternatively or additionally contain the corresponding acids, such as hydrochloric acid, sulfuric acid, citric acid, etc.

The chromatography device selected in step (id) is not particularly limited. The chromatography device can have any size, from the laboratory scale, where the volume $V_b$ of the chromatography bed is at most 500 mL, preferably at most 100 mL, particularly preferably at most 20 mL, even more preferably at most 5 mL, to the industrial scale, where the volume $V_b$ of the chromatography bed is more than 500 mL, preferably at least 1 L, particularly preferably at least 5 L, even more preferably at least 10 L. Preferably, the volume $V_b$ is at least 0.01 mL, more preferably at least 0.1 mL, particularly preferably at least 0.5 mL. It is further preferred that the volume $V_b$ is at most 1000 L, more preferably at most 500 L. Preferably, the chromatography device has a volume $V_b$ of the chromatography bed of more than 500 mL.

Figure 1:
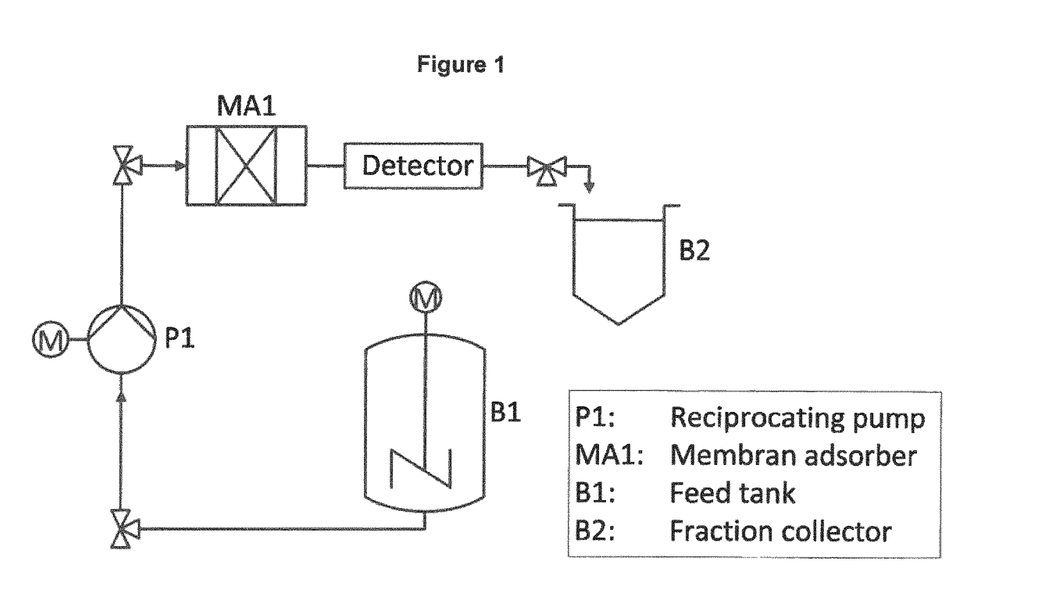
FIG. 1 shows an exemplary chromatographic set-up.

Preferably, step (id) does not only include the selection of the chromatography device but also the selection of at least one tank, a liquid pump, a detector, a plurality of valves and a process control software (selection of chromatography set-up), without being limited thereto. The chromatography set-up may vary in its machinery and systems by the processing complexity. For instance, the tank can be omitted e.g. when the chromatography method is a continuous chromatography method. In the exemplary chromatographic set-up displayed in FIG. 1, the reciprocating pump P1 promotes the feed solution from the feed tank B1 to the chromatographic device, here a membrane adsorber MA1. The corresponding detector signal is detected preferably downstream of the chromatographic device MA1. Thereafter, the mobile phase is preferably collected in a tank B2 or further purified. Impurities are preferably directed to a waste collector (not displayed in FIG. 1).

According to the present invention, the chromatography temperature is not particularly restricted as long as it is possible to carry out the chromatography at the selected temperature. Preferably, the chromatography temperature is more than 0° C., more preferably at least 1° C., particularly preferably at least 5° C., even more preferably at least 15° C., The upper limit of the chromatography temperature is preferably less than 100° C., preferably 80° C. or less, more preferably 70° C. or less, particularly preferably 60° C. or less, even more preferably 50° C. or less. The chromatography temperature may be varied during the chromatography method, preferably within the above-specified ranges. Preferably, the chromatography temperature is constant.

In step (iia) of the inventive method, the physical principles of the chromatography method are determined.

Generally, a person skilled in the art of chromatography methods is well aware of the physical principles and underlying equations for determining the relevant ones considering an actual chromatography setting.

As an example, according to the present invention, the fluid dynamic behavior of a non-binding tracer substance in a chromatographic column is discussed in more detail.

A model-based description of the problem can be achieved using equation (8).

$$\frac{\partial C_i(z, t)}{\partial c} = -v \frac{\partial C_i(z, t)}{\partial z} + D_{ax,i} \frac{\partial^2 C_i(z, t)}{\partial z^2} \tag{8}$$

C = concentration of component i in mobile phase
t = time
v = internal velocity of mobile phase
$D_{ax}$ = axial dispersion coefficient of component i
z = length In this case, the internal velocity is physically linked to the diameter of a possible pipe (equation (9) and (10)).

$$v = \frac{\dot{V}}{A\varepsilon_b} \tag{9}$$

$$A = \frac{\pi}{4} \cdot d^2 \tag{10}$$

A = Cross section area of the column
v = linear flow velocity of the mobile phase
$\dot{V}$ = volumetric flow rate
d = characteristic diameter
$\varepsilon_b$ = bulk porosity of the chromaogaphic bed/material A state-of-the-art mathematical solver would estimate one or more parameters independent of physical restrictions or links and thus the result can be physically incorrect. However, according to the present invention, at least two of the relevant parameters are evaluated in view of the interdependency, to give physically correct results concerning the respective chromatography method.

Figure 2:
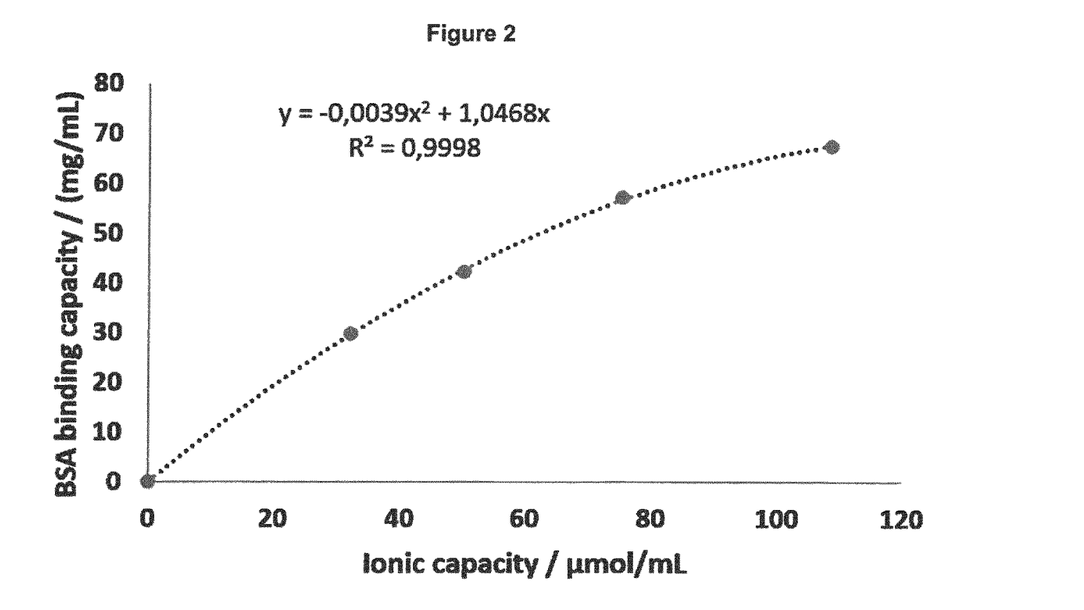
FIG. 2 shows the static binding capacity for bovine serum albumin (BSA) on an anion exchange membrane adsorber for varying ionic capacities, 20 mM TRIS HCl Buffer, pH=7.4.

In this context, according to the present invention, another important example for linked model parameters is the binding capacity and ionic capacity with respect to ion exchange chromatographic media. As an example, the binding capacity for bovine serum albumin (BSA) on an anion exchange membrane adsorber is shown in FIG. 2 for varying ionic capacities.

It can be observed, that a functional relation depending on the ionic capacity of the membrane adsorber can describe the static binding capacity. This link between both parameters has to be considered, for the determination of e.g. isotherm parameters. A prominent isotherm model to describe the binding on an ion-exchange material is the steric-mass-action (SMA) isotherm. For a single component the mathematical form is shown in equation (11):

$$c_{eq,i} = \frac{q_i}{k_{eq}} \cdot \left(\frac{c_{salt}}{\Lambda - (v_i + \sigma_i)q_i}\right)^{v_i} \tag{11}$$

$c_{eq,i}$ = Equilibrium concentration of component i in the mobile phase
$q_i$ = Equilibrium concentration of component i on the stationary phase
$k_{eq}$ = Equilibrium binding constant
$\Lambda$ = total ionic capacity
$v_i$ = Characteristic charge of component i
$\sigma_i$ = Shielding factor of component i A state-of-the-art approach to determine the above-mentioned isotherm parameters can be the chromatogram fitting (fitting procedure to acquire the smallest deviation between simulated and experimental signal) using different algorithms with no limits or parameter restrictions. As shown in FIG. 2, both isotherm parameters $\Lambda$ and $q_i$ are directly linked and cannot be determined independently. This would lead to physically inconsistent parameter sets and hinder a correct inter- or extrapolation with respect to a process development. However, according to the present invention, the determination of the relevant parameter sets is executed considering the interdependency of at least two of the relevant parameters, to result in an accurate evaluation and abstraction of the respective chromatography method.

With respect to the above-described isotherm parameters, a person skilled in the art is able to determine an adsorption isotherm based on his background knowledge. For instance, the adsorption isotherm can be a steric-mass-action (SMA) adsorption isotherm, as already mentioned above, a Langmuir adsorption isotherm or a Freundlich adsorption isotherm.

According to a preferred embodiment of the present invention, an SMA isotherm can be used as the adsorption isotherm. The SMA isotherm can be used in order to describe the adsorption of the at least one compound in dependence on influencing factors like the salt concentration and/or pH. An SMA isotherm can be determined as described in detail in Brooks, Clayton A.; Cramer, Steven M. (1992): Steric mass-action ion exchange. Displacement profiles and induced salt gradients. In AIChE J. 38 (12), pp. 1969-1978. DOI: 10.1002/aic.690381212; and in Journal of Chromatography A, 1233 (2012) 54-65 "Determination of parameters for the steric mass action model—A comparison between two approaches". The SMA isotherm is preferred when the stationary phase is an ion-exchange chromatography membrane.

In the following three equations, the electro neutrality in dependency of the steric factor $\sigma_i$ of the at least one compound, characteristic charge $v_i$ of the at least one compound and binding capacity of counter ions $q_1$ ($q_1$ is the binding capacity of the salt) as well as the binding capacity $q_i$ of the at least one compound are shown. In the formulae, n is the number of the at least one compounds and $\Lambda$ is the ionic capacity of the chromatographic medium (stationary phase).

$$\Lambda = q_1 + \sum_{i=2}^{n+1} (v_i + \sigma_i) q_i$$

$$\Lambda = q_1 + \sum_{i=2}^{n+1} v_i \cdot q_i$$

$$q_i = q_1 - \sum_{i=2}^{n+1} \sigma_i \cdot q_i$$

The ionic capacity $\Lambda$ of the chromatographic medium defines the number of ligands on the chromatographic backbone. The ionic capacity (or capacity of a chromatographic medium) $\Lambda$ can be determined by means of a chemical reaction of the ligands on the backbone with a characteristic component which binds to each of the ligands or by means of titration. For ion exchange chromatography (IEX), the ionic capacity $\Lambda$ is determined by titration of the charged ligands by the corresponding acid or base.

For a rapid equilibrium or in equilibrium state, the SMA isotherm can be written as in the following equation.

$$c_i = \frac{q_i}{k} \cdot \left( \frac{c_1}{\Lambda - \sum_{i=2}^{n+1}(v_i + \sigma_i)q_i} \right)^{v_i}$$

In the above equation, $c_i$ is the concentration of the at least one compound and $c_1$ is the salt concentration at the binding site.

The characteristic charge $v_i$ and the equilibrium constant k can be determined by the curve evaluation of the capacity factor log k' with the equation $$k' = \frac{1 - \varepsilon_T}{\varepsilon_T} \cdot \left( \frac{q_i}{c_i} \right)$$

in the equation $$\log k' = \log\left( \frac{1 - \varepsilon_T}{\varepsilon_T} \cdot k \cdot \Lambda^{v_i} \right) - v_i \cdot \log(c_1).$$

Using a linear regression of logarithmic capacity factor over logarithmic salt concentration results in the charge $v_i$ and equilibrium constant k by slope and intercept. The steric factor $\sigma_i$ can be fitted by error minimization on the experimental results or calculated with the following equations for $c_i \to \infty$; $q_1 \to 0$:

$$\lim_{c_i \to \infty} q_i = q_i^{max} = \frac{\Lambda}{\sigma_i + v_i}$$

According to another preferred embodiment of the present invention, a Langmuir isotherm can be obtained.

A Langmuir isotherm can be written for multiple components (i.e. in case there the number of the at least one compound is 2 or more) in the following form $$q_i = \frac{K_{eq,i} \cdot q_{max,i} \cdot c_i}{1 + \sum_{j=1}^{n} K_{eq,j} \cdot c_j}$$

where $q_i$ represents the binding capacity for compound i, $k_{eq,i}$ is the equilibrium adsorption constant, $q_{max,i}$ is the maximum binding capacity of the chromatographic medium and $c_i$ is the concentration of compound i in the mobile phase. Moreover, the sum $\sum_{j=1}^{n} K_{eq,j} \cdot c_j$ includes all components present in the mobile phase that are able to adsorb to the stationary phase, including compound i.

Following the work published by Yamamoto et al. (Biotechnology and Bioengineering, Vol XXV, Pp. 1465-1583 (1983)) and Forrer (Nicola Forrer, "Antibody purification with ion-exchange chromatography", dissertation, ETH Zurich 2008), the Langmuir parameters, namely the maximum binding capacity $q_{max,i}$ and the equilibrium binding constant $K_{eq,i}$, can be related to the salt concentration or pH within the fluid phase to describe the salt/pH dependent binding behavior. In the following equations, the salt concentration or the pH are expressed by $c_{mod}$.

$$q_{max,i} = a_1 \cdot c_{mod} + a_2$$

$$K_{eq,i} = b_1 \cdot \exp(-b_2 \cdot c_{mod})$$

The parameters $a_1$, $a_2$, $b_1$ and $b_2$ are coefficients used to describe the salt dependency of the isotherm parameters $K_{eq,i}$ and $q_{max,i}$. If the isotherm parameters have been acquired for different salt concentrations, the coefficients can be determined by a least-square fit of the above shown functions to the salt dependent isotherm parameter data sets.

According to the present invention, as shown in the equations above, parameter interdependencies can be identified with respect to the isotherm parameters and the conditions within the mobile phase.

$$q_{max,i} = f(\text{pH}, c(\text{salt}))$$

$$K_{eq,i} = f(\text{pH}, c(\text{salt}))$$

Using the coefficients $a_1$, $a_2$, $b_1$ and $b_2$, the interdependencies can be described in the above mentioned linear and exponential relation. The resulting parameter linkage restricts the independent determination of $K_{eq,i}$ and $q_{max,i}$ with respect to the corresponding pH and/or salt concentration within the mobile phase.

In case one or more of the conditions selected from the group consisting of the chromatography temperature, the pH of the mobile phase and the salt concentration of the mobile phase varies, several adsorption isotherms need to be obtained for each of the respective varying condition(s) so as to cover the whole range of chromatography temperatures, the whole range of the pH of the mobile phase and/or the whole range of the salt concentration of the mobile phase. In such a case, the adsorption isotherms for only some of the varying conditions can be obtained according to the present invention, while the adsorption isotherms for the other conditions can be obtained by means of interpolation using a functional relation, which describes the obtained data sets. A similar approach as described for the salt-dependency of the isotherm parameters can be used for the temperature or pH dependency.

In step (iib) of the inventive method, the relevant parameters from the physical principles are determined.

First of all, it should be noted that respective descriptions of parameters involved/concerned as already given above also apply to the descriptions and definitions given below for step (iib) of the method according to the present invention.

According to the present invention, parameter restrictions and linkages in chromatography are considered.

In this context, first of all, the chromatography device as such is considered.

According to the present invention, the linear flow velocity is a relevant aspect.

In particular, the linear flow velocity is linked to different model parameters. This is namely the volumetric flow rate $\dot{V}$, the flow cross-section A and the bulk porosity of the chromatographic material/bed $\varepsilon_b$.

$$v = \frac{\dot{V}}{A\varepsilon_b}$$

The flow cross-section depends on the geometrical nature of the chromatographic device. In case a cylindrical column is used, the cross-section is linked to the radius/diameter d of the pipe.

$$A = \frac{\pi}{4} \cdot d^2$$

The chromatographic device volume is linked to the geometric area of the device and its packing height h.

$$V = A \cdot h$$

The geometric device scale varies in a specific range, driven by the manufacture procedure, or within general quality error sources of error by manual device preparation. Such error sources can be but are not limited to individual personal error, deviation in material and deviation in procedure.

Another aspect according to the present invention is the bulk/internal/stationary phase porosity $\varepsilon$.

The porosity of a chromatographic bed is majorly determined by the material itself and its packing characteristics (pressure, compression, etc.). The values cannot be lower than 0% or higher than 100%. If the chromatographic medium shows a reversible swelling behavior, the porosity is linked to the surrounding conditions of the mobile phase like pH-value, salt concentration and temperature.

$$\varepsilon = f(T, \text{pH}, c(\text{salt}))$$

Furthermore, the different porosity values internal porosity $\varepsilon_p$, bulk porosity $\varepsilon_b$ and stationary phase porosity $\varepsilon_{sp}$ are all linked with respect to the total porosity of the chromatographic bed.

$$\varepsilon_T = \varepsilon_p + \varepsilon_b$$

$$\varepsilon_{sp} = \frac{\varepsilon_T - \varepsilon_b}{1 - \varepsilon_b}$$

For stationary phases having a pore size distribution in the range of the molecule, the internal porosity is a function of the molecule size. In this case the molecule can only enter pores having diameters equal to or magnitudes bigger than the molecule diameter.

$$\varepsilon_p = f(d_{Molecule}, r_{Molecule})$$

A next aspect according to the present invention is the axial dispersion coefficient.

For a uniform porous medium, having one interstitial velocity completely filled with fluid and at high Peclet numbers (>>1) the axial dispersion coefficient reduces to:

$$D_{ax} = \alpha \cdot v$$

These conditions are commonly satisfied during a chromatographic operation, which means, that the axial dispersion coefficient is directly linked to the linear flow velocity by a dispersivity factor $\alpha$. This factor can be determined by measuring the axial dispersion coefficient at different linear flow velocities via a linear regression as shown in Example 1. In a similar manner, the axial dispersion coefficient $D_{ax,DPF}$ Of the at least one compound in a hypothetical DPF ("distributed plug flow") can be calculated using the equation $D_{ax,DPF} = \alpha_{DPF} \cdot v$.

Alternatively, the axial dispersion coefficient $D_{ax}$ can be calculated from the following equation.

$$D_{ax} = \frac{vL}{Bo}$$

In the above equation, Bo is the Bodenstein number, v is the linear velocity and L is a characteristical length. The Bodenstein number is determined by a pulse tracer experiment in which the axial dispersion coefficient is ether fitted to the experimental data with error minimization or using the moment analysis. The characteristical length is the chromatography bed height (see Octave Levenspiel; Traxer Technology Modeling of the Flow of Fluids ISBN: 978-1-4419-8073-1).

As an alternative, the axial dispersion coefficient $D_{ax}$ can be calculated from the following equations.

$$D_{ax} = HETP \cdot \frac{u}{2 \cdot \varepsilon_b}$$

$$HETP = \frac{\sigma^2}{L} \frac{u}{\varepsilon_b}$$

In the above equations, HETP is the Height Equivalent to one Theoretical Plate and v is as defined above. HETP can be determined by tracer experiments in which the variance $\sigma$ of the corresponding peak, at a given linear velocity v and characteristic length L (chromatography bed height) is used.

Another aspect according to the present invention is the effective diffusion coefficient.

The effective diffusion coefficient within the stationary phase is linked to the bulk diffusion coefficient and commonly reduced by a tortuosity factor $\tau$.

The effective diffusion coefficient $D_{eff}$ is often by an order of magnitude lower in a porous system like a chromatographic resin or the hydrogel layer of a membrane adsorber due to the movement in a constricted pore system. This can be summarized as said tortuosity factor $\tau$.

$$D_{eff} = \frac{D_{bulk}}{\tau}$$

Thus, based on the bulk diffusion coefficient $D_{bulk}$ and the tortuosity factor τ, the effective diffusion constant $D_{eff}$ can be calculated.

The tortuosity factor, however, can be linked to the stationary phase porosity.

Following the correlation published by Mackie and Meares (J. S. Mackie, P. Meares, The Diffusion of Electrolytes in a Cation-Exchange Resin Membrane. I. Theoretical, Proc. R. Soc. London. Ser. A. Math. Phys. Sci. 232 (1955) 498-509. http://rspa.royalsocietypublishing.org/content/232/1191/498.abstract.), the tortuosity factor can be calculated using the stationary phase porosity $\varepsilon_{sp}$:

$$\tau = \frac{(2-\varepsilon_{sp})^2}{\varepsilon_{sp}^2}$$

In particular, the effective diffusion coefficient $D_{eff}$ can be calculated based on correlations if the bulk diffusion coefficient of the target molecule is known. The bulk diffusion coefficients of many molecules like globular proteins or viruses are published in the literature or can be estimated (for instance see Biotechnology and Bioengineering, Vol. XXII, Pp. 647-955 (1980)).

As a further alternative, the Einstein-Stokes equation can be used to estimate the bulk diffusion coefficient $D_{bulk}$ based on the molecule radius r, the dynamic viscosity of the solvent η, the temperature T and the Boltzmann constant $k_B$:

$$D_{bulk} = \frac{k_B T}{6\pi\eta r}$$

Under defined conditions, the molecule radius r can be determined using dynamic light scattering. This method relies on the intensity fluctuation of scattered light caused by molecular motions in solution. This method also offers a direct access to the diffusion coefficient.

The solution viscosity η can be determined using a failing-sphere viscosimeter. Stokes' law is the basis of the falling-sphere viscometer, in which the fluid is stationary in a vertical glass tube. A sphere of known size and density is allowed to descend through the liquid. If correctly selected, it reaches terminal velocity, which can be measured by the time it takes to pass two marks on the tube. Electronic sensing can be used for opaque fluids. Knowing the terminal velocity, the size and density of the sphere, and the density of the liquid, Stokes' law can be used to calculate the viscosity of the fluid.

The stationary phase porosity $\varepsilon_{sp}$ can be determined as described above.

A next aspect according to the present invention is the binding capacity.

Depending on the model used to describe the binding of the target molecule on the stationary phase, a linkage between the ligand density and the binding capacity can be identified:

It can be observed from FIG. 2, that a functional relation depending on the ionic capacity of the membrane adsorber can describe the static binding capacity. This link between both parameters has to be considered, for the determination of e.g. isotherm parameters. A prominent isotherm model to describe the binding on an ion-exchange material is the steric-mass-action (SMA) isotherm, as described above. For a single component the mathematical form is shown in equation (11):

$$c_{eq,i} = \frac{q_i}{k_{eq}} \cdot \left(\frac{c_{salt}}{\Lambda - (v_i + \sigma_i)q_i}\right)^{v_i} \quad (11)$$

$c_{eq,i}$ = Equilibrium concentration of component i in the mobile phase
$k_{eq}$ = Equilibrium binding constant
$v_i$ = Characteristic charge of component i
$q_i$ = Equilibrium concentration of component i on the stationary phase
$\Lambda$ = total ionic capacity
$\sigma_i$ = Shielding factor of component i Furthermore, a linkage between ionic capacity and steric hindrance factor and/or the molecule size can be formulated. Moreover, the molecule size or structural formation as e.g. circular or acicular can be pH dependent.

$$\sigma_i = f(\Lambda, c_s, \text{pH}, T)$$

According to an embodiment of the present invention, next to the chromatography device, also the external system can be evaluated and abstracted.

In numerous cases, a chromatography device does not only contain the stationary phase/chromatography bed. Ancillary elements, like valves, tubings, flow distributors, etc. may be present. These ancillary elements, i.e. parts of the chromatography device through which the mobile phase flows and which are different from the chromatography bed are referred to as "external system". The influences of these ancillary elements on the hydrodynamic properties of the chromatography device can be taken account of as described in the following.

According to the present invention, considering the external system, one aspect is the linear flow velocity.

The linear flow velocity in the external system can be linked to different parameters. This depends on the geometrical nature of the external system part. If the tubings of the external system are considered, the following relation can be proposed:

$$v = \frac{\dot{V}}{A}$$

The flow cross-section also depends on the geometrical nature of the external system. In case of a pipe, the cross-section is linked to the radius/diameter d of the pipe.

$$A = \frac{\pi}{4} \cdot d^2$$

Another aspect according to the present invention, considering the external system, is the axial dispersion coefficient.

If the external system is described by a distributed plug flow model ("DPF model"), the axial dispersion coefficient shows the same restriction as for the chromatographic device. It depends on the linear flow velocity:

$$D_{ax} = a \cdot v$$

According to the present invention, another aspect in view of the external system is the system volume.

The total system volume is highly correlated to the geometrical nature of the external system. If a the external system mainly consists of tubings and pipes, the volume can be linked to the geometrical dimensions $$V = \frac{\pi}{4} \cdot d^2 \cdot l$$

where l reflects the tubing/pipe length.

In step (iiia) of the inventive method, the at least two parameters are selected from the relevant parameters.

According to the present invention, any two parameters comprised by the chromatography method which are interdependent can be selected as the at least two parameters. According to a preferred embodiment of the present invention, the at least two parameters are the internal velocity and the diameter of the chromatography device:

$$v = \frac{\dot{V}}{A\varepsilon_b}$$

$$A = \frac{\pi}{4} \cdot d^2$$

wherein
- $v$ represents the velocity of the mobile phase in the chromatography bed,
- $\dot{V}$ represents the volumetric flow rate,
- A represents the cross section area of the chromatography device,
- $\varepsilon_b$ represents the bulk porosity of the chromatography bed, and
- d represents the diameter of the chromatography device.

According to another preferred embodiment, the at least two parameters are the binding capacity $q_i$ and the ionic capacity $\Lambda$ of the at least one stationary phase:

$$c_{eq,i} = \frac{q_i}{k_{eq}} \cdot \left(\frac{c_{salt}}{\Lambda - (v_i + \sigma_i)q_i}\right)^{v_i} \quad (11)$$

wherein
- $c_{eq,i}$ represents the equilibrium concentration of component i in the mobile phase,
- $q_i$ represents the equilibrium concentration of component i on the stationary phase,
- $k_{eq}$ represents the equilibrium binding constant,
- $\Lambda$ represents the total ionic capacity,
- $v_i$ represents the characteristic charge of component i, and
- $\sigma_i$ represents the shielding factor of component i.

According to the present invention, the methods for the determination/identification of physically linked/restricted parameters are e.g. geometrical analysis, literature known correlations, design-of-experiment approaches and the use of vendor provided correlations, wherein these methods can be used singly or in any combination.

In step (iiib) of the inventive method, the interdependency of the at least two parameters using the at least one chromatography device and the at least one compound is determined. Principally, said interdependency can be estimated using error minimization for global physically correct parameter sets. Corresponding methods can be described as e.g. fitting procedures using different algorithms. According to a preferred embodiment of the present invention, step (iiib) of determining the interdependency of the at least two parameters involves one or more laboratory experiments.

In step (iv) of the inventive method, the relevant parameters using the determined interdependency of the at least two parameters are evaluated. In case said parameter evaluation considering e.g. boundary conditions, restrictions and physical links results in being not valid, the model building procedure as outlined above has to be restarted, in order to overcome the invalidity of the actual evaluation.

In step (v) of the inventive method, the validity of the physical principles of the chromatography method is evaluated. According to the present invention, in line with the foregoing step (iv), in case the physical principles of the chromatography method appear to be not valid, the model building procedure as outlined above has to be restarted, in order to overcome the invalidity of the physical principles underlying the chromatography method.

However, in case of a resulting valid chromatography method, according to the present invention, there can be executed a detailed/mechanistic modelling of the respective chromatography process, in order to further develop the process, to inter- and extrapolate the respective process parameters and to scale-up the respective setting from a laboratory to an industrial scale.

Figure 3:
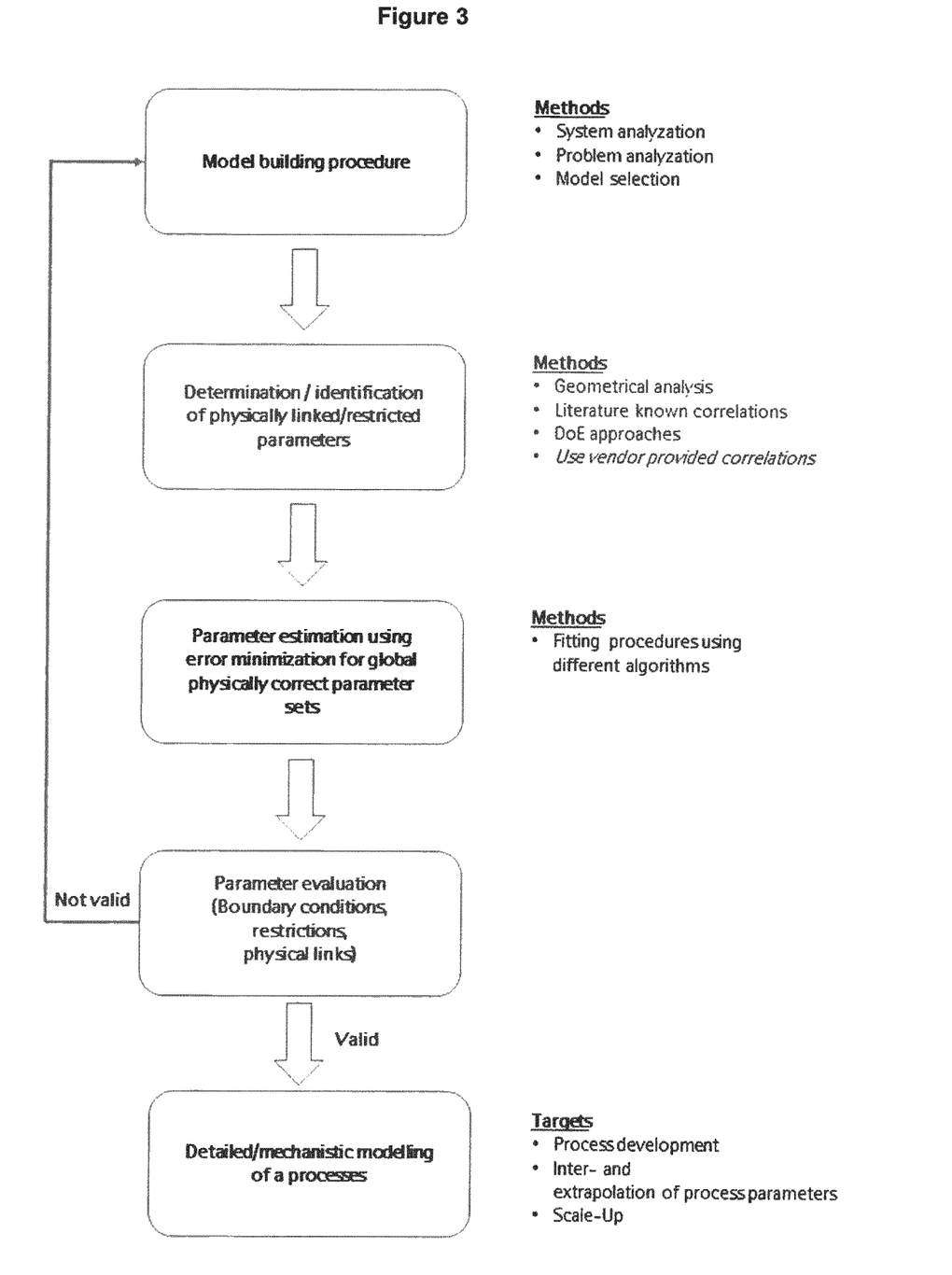
FIG. 3 shows a flow chart of the disclosed parameter determination/modeling approach according to the present invention.

A summary of the above-described aspects of the present invention is given in FIG. 3 as a flow chart.

According to a preferred embodiment of the present invention, step (iia) is carried out with taking an implementation of manufacturing, estimated tolerances, side effects, deviations and/or error margins into account.

In a further aspect, the present invention relates to a method of obtaining at least one chromatography method parameter, selected from the group consisting of stationary phase, mobile phase and chromatography device, comprising the steps of (I) executing the method of determining the interdependency of at least two parameters in a chromatography method as described above; and (II) selecting at least one stationary phase, at least one mobile phase, and/or at least one chromatography device based on the result of step (I).

Moreover, in a further aspect, the present invention relates to a chromatography method comprising the method of determining the influence of the interdependency of at least two parameters in a chromatography method as described above, and (vi) a step of carrying out the chromatography.

In a further aspect, the present invention relates to a chromatography method comprising the method of obtaining at least one chromatography method parameter as described above, and (III) a step of carrying out the chromatography based on the at least one chromatography parameter selected in step (II).

In comparison with the state of the art, the parameter estimation procedure according to the present invention described herein includes an additional step, which integrates the necessary identification of physically linked/restricted parameters, which advantageously leads to an error minimization for a global physically logical parameter estimation.

According to a preferred embodiment of the present invention, in addition to physically connected parameter determination, the estimation can be specified by implementation of manufacturing or estimated tolerances. These boundary conditions allow a physically linked possible parameter space in which the desired built model has to consist in the desired accuracy. Inconsistent model building, which would lead to a fail in transferability, can be identified, evaluated, rejected and revised. Furthermore, a successful model can predict the abbreviation in processing based on the known tolerances.

Moreover, according to the present invention, if more than one physical parameter is unknown and needs to be estimated, the implementation of manufacturing tolerance allows a conditionally proven error minimization/parameter estimation. This reduces the high possible variations in model building by physical constrains and makes the evaluation and model building itself advantageously easier. The evaluation of possible errors in the model is one of the main challenges in simulation, which, without a reliable model transferability and prediction as according to the present invention, leads to invalid results.

Furthermore, according to the present invention, the model calibration procedure described herein results in a system model (and parameter/coefficients) that reliably represent performance of the physical components. Relative to the traditional model fitting procedure that minimizes prediction error, the method according to the present invention is capable of extrapolation to new conditions and configurations. In contrast thereto, according to the state of the art, models calibrated using traditional methods are suitable for prediction under similar conditions of the calibration space but do not contain causal information, meaning that they are often not useful for optimization or advanced control.

According to the present invention, the method of determining the influence of the interdependency of at least two parameters in a chromatography method results in the benefits of realistic model selection/evaluation, the possibility of scale-up/scale-down of respective chromatography systems, the prediction of system performance with new configurations, the optimization—exploration of operating space, potentially outside of calibration space, to find the best operating conditions and the simulation in that system performance can be simulated under new conditions.

The present invention is further illustrated by means of the following non-limiting Examples.

EXAMPLE 1

Model Building

For an exemplary model building procedure the behavior of a chromatographic system including the system dispersion for a binding substance is chosen. The used chromatographic medium is a membrane adsorber.

The model building procedure is summarized below:
System Analyzation
    System delivers fluids to the chromatographic device/column/medium
    Fluid is distributed by wall effects, back mixing, solid phase
    Time/velocity dependency may occur in fluid distribution effects
    Connection of liquid phase to solid phase (adsorption)
    Chromatographic media interacts with solved fluid entities (dynamic effects)
    Time/velocity dependency may occur
        Reaction kinetics may take place
        Dynamic effects
        Transport limitations
Problem Analyzation
    Fluid Dynamics $$\underbrace{\frac{\partial C_i(z,t)}{\partial t}}_{\text{Concentration change by time}} = \underbrace{-v\frac{\partial C_i(z,t)}{\partial z}}_{\text{Convective transport by e.g. pumping}} + \underbrace{D_{ax,i}\frac{\partial^2 C_i(z,t)}{\partial z^2}}_{\text{Fluid distribution by back mixing, etc.}}$$

$$\underbrace{\frac{\partial C_i(z,t)}{\partial t}}_{\text{Concentration change by time}} =$$

$$\underbrace{-v\frac{\partial C_i(z,t)}{\partial z}}_{\text{Convective transport by e.g. pumping}} + \underbrace{D_{ax,i}\frac{\partial^2 C_i(z,t)}{\partial z^2}}_{\text{Fluid distribution by back mixing, etc.}} - \underbrace{k_{\mathit{eff}} \cdot \frac{1-\varepsilon_{ges}}{\varepsilon_{ges}} \cdot (c_i - c_{p,i})}_{\text{Mass transfer}}$$

Adsorption and Dynamic Effects $$\frac{dc_P}{dt} = \frac{k_{\mathit{eff}}}{\varepsilon} * (c_i - c_p) - \frac{(1-\varepsilon)}{\varepsilon} * \frac{dq_i}{dt}$$

$$c_{eq,i} = \frac{K_{eq,i}}{q_i} \cdot \left(\frac{c_s}{\Lambda - \sum_{i=2}^{j}(\sigma_i + v_i) \cdot q_i}\right)^{v_i}$$

Model Selection

The problem can be described using a rate-based model. Due to the minor mass-transfer limitations in a membrane adsorber, the mass transfer effects are described by a lumped film-diffusion coefficient. A general model is described as follows:
    Fluid dynamic of the chromatographic system
        General model, which displays all significant effects
            Stirred tank
            Continuous plug flow reactor
    Fluid dynamic of the chromatographic medium
        Continuous plug flow reactor bearing a porous medium
    Mass transfer
        Empirical equations for parameter evaluation
            Lumped film-diffusion coefficient
        Isotherm
            SMA Determination of Physically Linked/Restricted Parameters The velocity is calculated by the pump provided volumetric flow divided by the cross section area times the overall porosity. For a pipe, the porosity equals one, for a chromatographic medium the external porosity has to be determined. The cross section area is calculated by the pipe diameter.

$$v = \frac{\dot{V}}{A} \cdot \varepsilon_T$$

$$A = \frac{\pi}{4} \cdot d^2$$

Therefore, the linear flow velocity has to be calculated based on the dimensions of the LC system and the chromatographic medium.

For a uniform porous medium, having one interstitial velocity completely filled with fluid and at high Peclet numbers (>>1) the axial dispersion coefficient reduces to:

$$D_{ax} = \alpha \cdot v$$

where $\alpha$ is a dispersivity factor. This factor can be determined by measuring the axial dispersion coefficient at different linear flow velocities. This functional link to the linear flow velocity constricts the axial dispersion coefficient values.

With respect to fluid dynamic behavior, a physical link between the column/system dimensions, the linear flow velocity and the axial dispersion coefficients could be established.

A parameter determination by a fitting procedure has to be performed with respect to this linkage to determine a physically meaningful parameter set.

Parameter Estimation

Estimation of Fluid Dynamic Model Parameters

Different number of membrane samples are prepared in a developed device. The different bed volumes enable the separation of device and stationary phase influence onto the fluid dynamic.

| Bed volume LP15 [mL] | Bed volume Nano [mL] | Bed volume Sartopress 30 [mL] | Bed volume Sartopress 60 [mL] |
|---|---|---|---|
| 0.42 | 3 | 3.5 | 7.6 |

Scale Up—Model and Experimental Set-Up

The LC system and MA are simulated by the equilibrium dispersive model. Overall LC System is 2943 mm pipe length, a volume of 1.3 mL and a porosity of 1. The overall MA device is represented by 6.1 to 13.3 mm bed height, 3.5 to 7.6 mL bed volume and a porosity of 54%.

Figure 4:
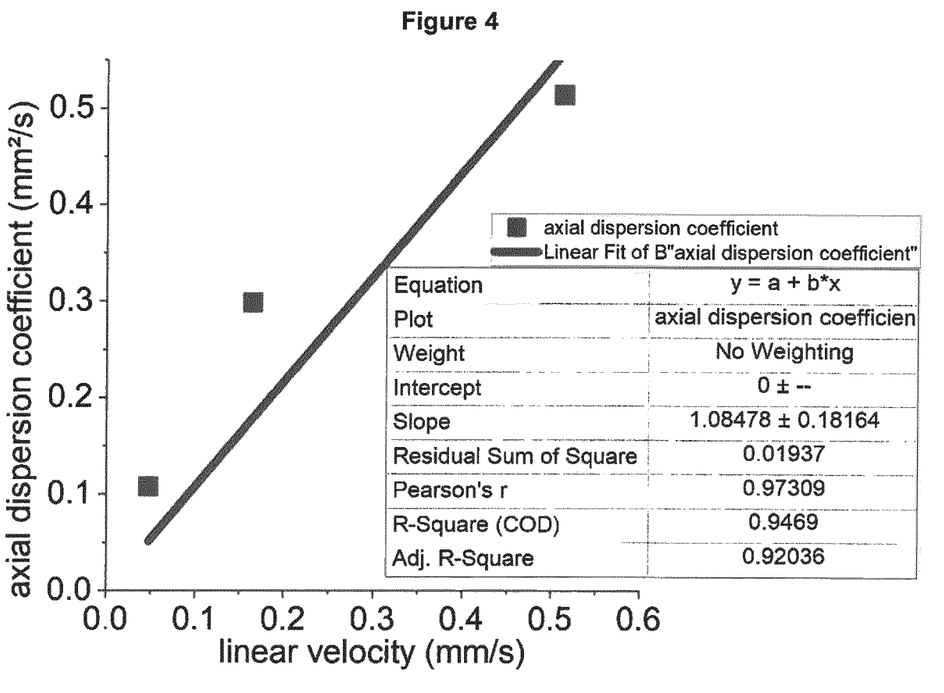
FIG. 4 shows the axial dispersion coefficient $D_{ax}$ for the chromatographic medium/bed depending on the linear flow velocity of Example 1.
Figure 5:
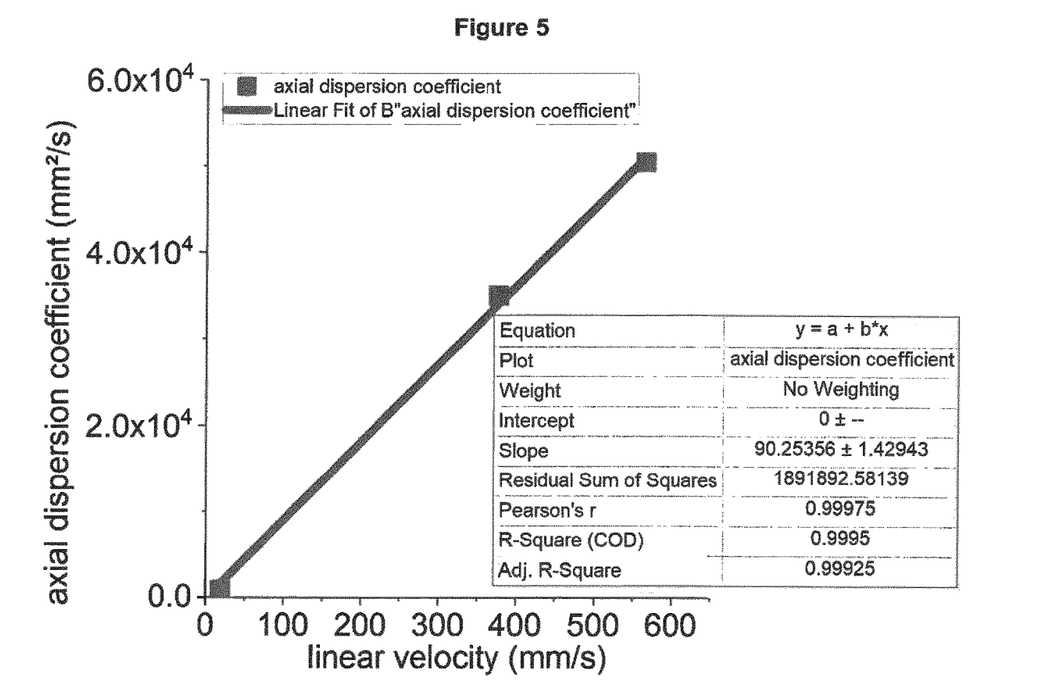
FIG. 5 shows the axial dispersion coefficient $D_{ax}^{DPF}$ of the DPF of the external system "ST+DPF" ("ST"=stirred tank) depending on the linear flow velocity of Example 1.

The fluid dynamic of device (FIG. 4) and system (FIG. 5) are characterized separately with tracer experiments. Therefore, 2 mL 20 mM TRIS HCl with 5% acetone is injected and the resulting chromatogram recorded. Linear velocity is investigated from 18.9-566 m/s and 0.05-0.514 mm/s for the LC respectively the laboratory MA. Volume of the system is 1.3 mL and 3.5 mL for the laboratory device. The function of velocity and axial dispersion coefficient is determined by error minimization of the simulation and the experimental tracer experiment. The function is then used for calculation of each further experiment axial dispersion coefficient.

The tracer experiments are further used for device and membrane volume determination. The physically known parameter enables the advanced physically linked parameter estimation of membrane/device separated linear velocity and axial dispersion coefficient.

$$D_{ax} = f(u)$$

$$u_i = \frac{\dot{V}}{A} = \frac{\dot{V}}{\frac{\pi}{4} d_i^2}$$

$$V = \frac{\pi}{4} d_i^2 \cdot h$$

$$\frac{\partial C_i(z,t)}{\partial t} = -v \frac{\partial C_i(z,t)}{\partial z} + D_{ax,i} \frac{\partial^2 C_i(z,t)}{\partial z^2}$$

The separation of device and membrane influence onto the fluid dynamic enable the transfer to different device geometries. Without the physical linkage of device volume, diameter, bed height and thus velocity and axial dispersion, other mathematically solve error minima are determined. The enhanced physically linked estimator has only one global minimum which is determined.

Summarized the enhanced estimation routine finds the global minimum of simulation parameters while simultaneously taking their physical interdependencies into account.

The invention claimed is:

1. A method of modelling a chromatography method under the influence of the interdependency of at least two parameters in the chromatography method comprising:
   carrying out a model building procedure comprising the steps of
   selecting at least one compound;
   selecting at least one stationary phase;
   selecting at least one mobile phase;
   selecting at least one chromatography device having a chromatography bed comprising the at least one stationary phase and the at least one mobile phase;
   determining the physical principles of the chromatography method;
   determining the relevant parameters from the physical principles, wherein the relevant parameters are the following:
   internal porosity/voidage,
   bulk porosity/voidage,
   total porosity/voidage,
   stationary phase porosity,
   cross section area of the column,
   column diameter,
   height of chromatographic bed,
   chromatography bed volume,
   volumetric flow rate,
   internal velocity of mobile phase,
   axial dispersion coefficient of a component i,
   effective diffusion coefficient,
   tortuosity factor,
   equilibrium concentration of a component i in the mobile phase,
   equilibrium concentration of a component i on the stationary phase,
   equilibrium binding constant of a component i,
   total ionic capacity,
   characteristic charge of a component i, and
   shielding factor of a component i;
   selecting the at least two parameters from the relevant parameters;
   determining the interdependency of the at least two parameters using the at least one chromatography device and the at least one compound;
   wherein when an evaluation of the relevant parameters using the determined interdependency of the at least two parameters considering boundary conditions, restrictions, and physical links results in being not valid, the model building process is restarted; and wherein when the physical principles of the chromatography method appear to be not valid, the model building process is restarted, wherein the step of determining the interdependency of the at least two parameters comprises performing one or more laboratory experiments.

2. The method according to claim 1, wherein step of determining the physical principles of the chromatography method is carried out with taking an implementation of manufacturing, estimated tolerances, side effects, deviations and/or error margins into account.

3. The method according to claim 1, wherein the at least two parameters are the internal velocity and the diameter of the chromatography device:

$$v = \frac{\dot{V}}{A\varepsilon_b}$$

$$A = \frac{\pi}{4} \cdot d^2$$

wherein $v$ represents the velocity of the mobile phase in the chromatography bed, $\dot{V}$ represents the volumetric flow rate, A represents the cross section area of the chromatography device, $\varepsilon_b$ represents the bulk porosity of the chromatography bed, and d represents the diameter of the chromatography device.

4. The method according to claim 1, wherein the at least two parameters are the binding capacity $q_i$ and the ionic capacity $\Lambda$ of the at least one stationary phase:

$$c_{eq,i} = \frac{q_i}{k_{eq}} \cdot \left( \frac{c_{salt}}{\Lambda - (v_i + \sigma_i)q_i} \right)^{v_i}$$

wherein $c_{eq,i}$ represents the equilibrium concentration of component i in the mobile phase, $q_i$ represents the equilibrium concentration of component i on the stationary phase, $k_{eq}$ represents the equilibrium binding constant, $\Lambda$ represents the total ionic capacity, $v_i$ represents the characteristic charge of component i, and $\sigma_i$ represents the shielding factor of component i.

5. The method according to claim 1, wherein the stationary phase is a chromatography membrane or a monolith.

6. The method according to claim 1, wherein the at least one compound comprises a protein and/or a drug.

7. A method of obtaining at least one chromatography method parameter, selected from the group consisting of stationary phase, mobile phase and chromatography device, comprising the steps of (I) executing the method according to claim 1; and (II) selecting at least one stationary phase, at least one mobile phase, and/or at least one chromatography device based on the result of step (I).

8. A chromatography method comprising the method of modelling a chromatography method under the influence of the interdependency of at least two parameters in the chromatography method according to claim 1, and further comprising:

carrying out the chromatography.

9. A chromatography method comprising the method of obtaining at least one chromatography method parameter according to claim 7, and further comprising:

(III) carrying out the chromatography based on the at least one chromatography parameter selected in step (II).

* * * * *